United States Patent
Linn

(10) Patent No.: US 7,536,537 B2
(45) Date of Patent: May 19, 2009

(54) SIMULTANEOUS DUAL BOOTING OF PLATFORMS

(75) Inventor: Charles A. Linn, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 478 days.

(21) Appl. No.: 11/408,834

(22) Filed: Apr. 20, 2006

(65) Prior Publication Data
US 2007/0250692 A1 Oct. 25, 2007

(51) Int. Cl.
*G06F 9/00* (2006.01)
(52) U.S. Cl. ................... 713/1; 713/2; 709/222
(58) Field of Classification Search ............. 713/1, 713/2; 709/222
See application file for complete search history.

(56) References Cited

U.S. PATENT DOCUMENTS

| | | | |
|---|---|---|---|
| 6,178,503 | B1 | 1/2001 | Madden et al. |
| 6,272,629 | B1 * | 8/2001 | Stewart ................... 713/2 |
| 6,564,318 | B1 * | 5/2003 | Gharda et al. ............ 713/2 |
| 6,810,478 | B1 | 10/2004 | Anand et al. |
| 6,823,181 | B1 | 11/2004 | Kohno et al. |
| 6,961,848 | B2 | 11/2005 | Fish et al. |
| 7,100,038 | B2 * | 8/2006 | Haswarey et al. ....... 713/2 |
| 7,231,434 | B2 * | 6/2007 | Raghunandan .......... 709/220 |
| 2003/0120918 | A1 * | 6/2003 | VanDer Kamp ......... 713/164 |
| 2005/0289332 | A1 * | 12/2005 | Rothman et al. ........ 713/1 |
| 2007/0028082 | A1 * | 2/2007 | Lien ...................... 713/1 |

* cited by examiner

Primary Examiner—Thomas Lee
Assistant Examiner—Vincent T Tran
(74) Attorney, Agent, or Firm—Darby & Darby PC; Robert J. Sacco

(57) ABSTRACT

A method for booting a software operating environment and software applications within a wireless communications system (100) is provided. The method (500) includes executing one or more boot manager programs (516). The method further includes executing a first stage program code (614) and a second stage program code (618) in response to a boot manager program. The method includes loading an operating system (714) and launching a low level radio function application (716) in response to a boot manager program. The low level radio function can be an emergency communications application. Subsequent to loading the operating system and launching the low level radio function application, the method further includes loading a middleware (812) and a core framework (814) in response to the second stage program code. The method includes loading a device driver software programs in response to the first stage program code. The device driver software programs can be allocated and deallocated upon stated events. A computer program product in a computer readable medium is also provided. A computer processing system for booting a software operating environment and software applications within a wireless communications system is also provided.

41 Claims, 9 Drawing Sheets

SIMULTANEOUS DUAL BOOTING OF PLATFORMS

STATEMENT REGARDING FEDERALLY SPONSORED RESEARCH OR DEVELOPMENT

This invention was made with government support under contract number FA8709-04-C-0010. The government has certain rights in the invention.

BACKGROUND OF THE INVENTION

1. Statement of the Technical Field

The invention concerns wireless communications equipment, and more particularly, software defined radio supporting a software communications architecture.

2. Description of the Related Art

A software defined radio (SDR) is a programmable and reconfigurable system that provides a flexible and scaleable architecture. Such a radio system typically supports many different communication waveforms, thus facilitating improved communications among users, such as government agencies and government services.

A typical software architecture for an SDR comprises an operating environment and software applications, such as a waveform application or a communications application. The operating environment includes a real time operating system, a middleware component, and a framework to manage applications. An example of such an architecture is the Joint Tactical Radio Systems (JTRS) Software Communications Architecture (SCA). The middleware typically is a common object request broker. Similar to traditional computer systems, the SDR's operating environment needs to be booted upon user activation of the system. In a typical SDR, the SCA infrastructure, operating environment and waveform services must be initialized before a simple communications application can be run. The operating environment and the software applications are typically booted in a specified sequence upon user activation of the system.

A typical boot sequence for a software defined radio includes five boot layers. For example, the device drivers are typically loaded first. After the device drivers are loaded, the operating system is loaded, followed by the common object broker and the core framework. Once the full operating environment is loaded, the platform devices and services (i.e., common object request broker architecture (CORBA) components) are loaded. Subsequently, any other software applications are launched.

In such a boot processing, the formal separation between the operating environment and the software applications, in conjunction with the use of a common object request broker and the large size of these executable components, causes the SDR to boot rather slowly. A SDR using this boot processing method typically powers up in two (2) to fifteen (15) minutes. This is a long time period compared to a traditional radio system's boot processing which typically takes five (5) to thirty (30) seconds.

A person can appreciate the need in a military context of being able to use a radio device almost instantaneously in emergency situations. For example, in a time-critical situation, such as when a group of armed forces come under attack, the need to be able to relay information between other members of the armed forces as quickly as possible is absolutely necessary. Accordingly, a boot process is needed which takes a shorter amount of time to power up the SDR to the point where it is able to perform critical or emergency communications.

SUMMARY OF THE INVENTION

The invention concerns a method for booting a software operating environment and one or more software applications within a wireless communications system, such as a software defined radio. The method includes executing one or more boot manager programs. The method further includes executing a first stage program code and a second stage program code in response to a boot manager program. The method includes launching a low level radio function application in response to the first stage program code. Subsequent to launching the low level radio function application, the method further includes loading a middleware and a core framework in response to the second stage program code.

According to an embodiment of the invention, the first stage program code is used to load an operating system or an operating system kernel. The method also includes loading one or more device driver software programs concurrently with the first stage program code. The device driver software programs can be allocated and deallocate upon stated events. For example, the device driver software programs can be allocated when the low level radio communications application begins to run. Similarly, the device driver software programs can be deallocated when the low level radio communications application finish running. According to another embodiment of the invention, the low level radio function application can be selected to include an emergency communications application.

According to another embodiment of the invention, the middleware can be selected to include an object request broker software program. The second stage program can be used to load an operating system or a portion of an operating system not loaded using the first stage program code. The second stage program can further be used to load one or more radio device software programs, such as a software interface to control an antenna, a transmitter, a receiver, and/or a frequency synthesizer. For example, a radio device software program can include instructions for rotating an antenna, changing a frequency of an amplifier, changing a power level of an amplifier, loading a field programmable gate array, and/or sending/receiving serial data to an external computing device. The second stage program can be used to load one or more radio service software programs, such as a software routine for fault management, encryption, and/or decryption. The second stage program can be used to launch one or more installed applications, such as a radio channel control application or a device configuration application, as well as one or more application plugins. The installed application can include instructions for communicating with one or more hardware entities for performing radio channel selection, frequency selection, modulation, or demodulation.

A computer program product in a computer readable medium is also provided. The computer program product can be used in a data processing for booting a software operating environment and one or more software applications within a wireless communications system, such as a software defined radio. The computer program product can comprise instructions for executing one or more boot manager programs. The computer program product comprises instructions for executing a first stage program. The first stage program code contains instructions for launching a low level radio function application, such as an emergency communications application. Subsequent to the instructions for launching a low level radio function application, the computer program product can comprise instructions for executing a second stage program code. The second stage program code can comprise instructions for loading a middleware and a core framework.

According to an embodiment of the invention, the first stage program code includes instructions for loading an operating system or an operating system kernel. The first stage program code can also include instructions for loading one or more device driver software programs. The first stage program code can also include instructions for allocating and deallocating the device driver software programs upon stated events. For example, the device driver software programs can be allocated when the low level radio communications application begins to run. Similarly, the device driver software programs can be deallocated when the low level radio communications application finish running. According to another embodiment of the invention, the radio function application can include instructions for an emergency communications application.

The second stage program code includes instructions for loading an operating system or a portion of an operating system not included in the operating system kernel. The second stage program code can also include instructions for loading one or more radio device software programs, such as a software interface to control an antenna, a transmitter, a receiver, and/or a frequency synthesizer. The second stage program can include instructions for loading one or more radio service software programs, such as a software routine for fault management, encryption, and/or decryption. The second stage program code can also include instructions for launching one or more installed applications and one or more application plugins. The installed application can include instructions for communicating with one or more hardware entities for performing radio channel selection, frequency selection, modulation, or demodulation. For example, the second stage program can include instructions for launching radio channel control applications and/or waveform control applications for processing by a number of microprocessors. According to another embodiment of the invention, the middleware can have instructions for an object request broker software program.

A computer processing system for booting a software operating environment and one or more software applications within a wireless communications system, such as a software defined radio, is provided. The computer processing system can include a data store comprising one or more boot manager programs, a first stage program code, and a second stage program code. The first stage program code can comprise instructions for launching a low level radio function application. The second stage program code can comprise instructions for loading a middleware and a core framework. The computer processing system can further comprise a processor means responsive to a boot manager program for executing the first stage program code and a second stage program code. However, the processor means can only execute the second stage program code upon completion of executing the first stage program code.

According to an embodiment of the invention, the low level radio function application can be an emergency communications application. The first stage program code comprises instructions for loading an operating system or an operating system kernel. The first stage program code can also include instructions for loading one or more device driver software programs. The first stage program code can also comprise instructions for allocating and deallocating the device driver software programs upon stated events. For example, the device driver software programs can be allocated when the low level radio communications application begins to run. Similarly, the device driver software programs can be deallocated when the low level radio communications application finish running.

The second stage program code includes instructions for loading an operating system or a portion of an operating system not included in the operating system kernel. The second stage program code can further comprise instructions for loading one or more radio device software programs, such as a software interface to control an antenna, a transmitter, a receiver, and/or a frequency synthesizer. The second stage program code can comprise instructions for loading radio service software programs, such as a software routine for fault management, encryption, and/or decryption. The second stage program code can also comprise instructions for launching one or more installed applications and one or more application plugins. The installed application can include instructions for communicating with one or more hardware entities for performing radio channel selection, frequency selection, modulation, or demodulation. For example, the second stage program can include instructions for launching radio channel control applications and/or waveform control applications for processing by a number of microprocessors. According to another embodiment of the invention, the middleware can be an object request broker software program.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

To facilitate an understanding of the Detailed Description, definitions are provided for certain terms used therein. To "load" means to copy data from a storage medium, such as a disk, to a main memory. A program needs to be loaded before it can be executed. Loading a program further means copying the program into a place, such as a system memory, where the program can be accessed and used by another program. To "launch" means to start a program.

Figure 1:
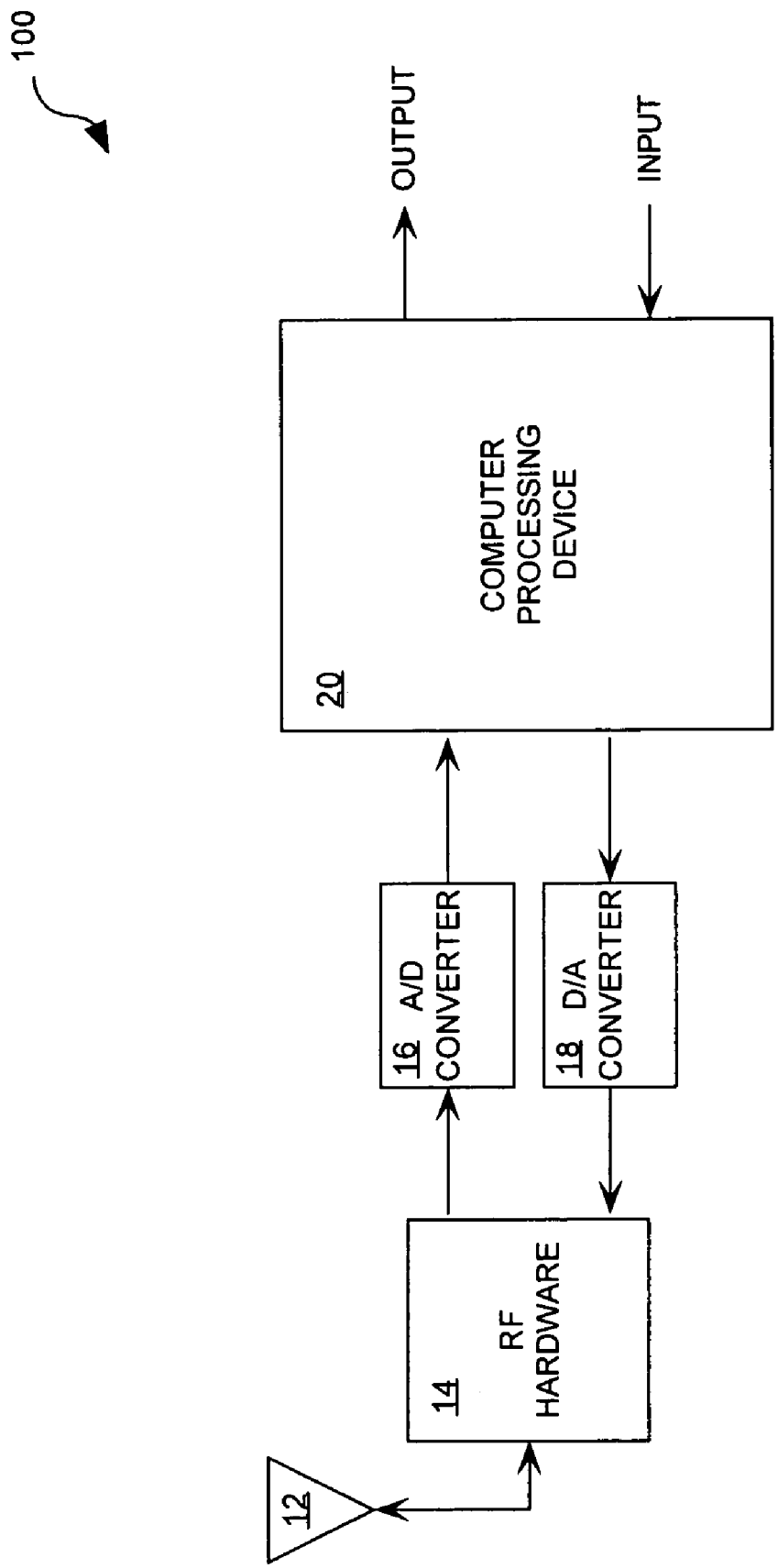
FIG. 1 is a block diagram of a software defined radio system hardware architecture.

FIG. 1 is a block diagram of a software defined radio 100 hardware architecture. A software defined radio (SDR) 100 typically includes an antenna element 12, RF hardware 14, an A/D converter 16, a D/A converter 18, and a computer processing device 20. The RF hardware 14 can include filters and/or amplifiers. The components of the SDR 100 are known to persons skilled in the art. Thus, the above listed components will not be described in great detail herein.

A person skilled in the art will appreciate that the SDR 100 hardware architecture is one embodiment of a hardware architecture in which the methods described below can be implemented. However, the invention is not limited in this regard and any other suitable SDR hardware architecture can be used without limitation. A person skilled in the art will further appreciate that the methods described below may be used with non-radio wireless communications system hardware architectures as well.

Figure 2:
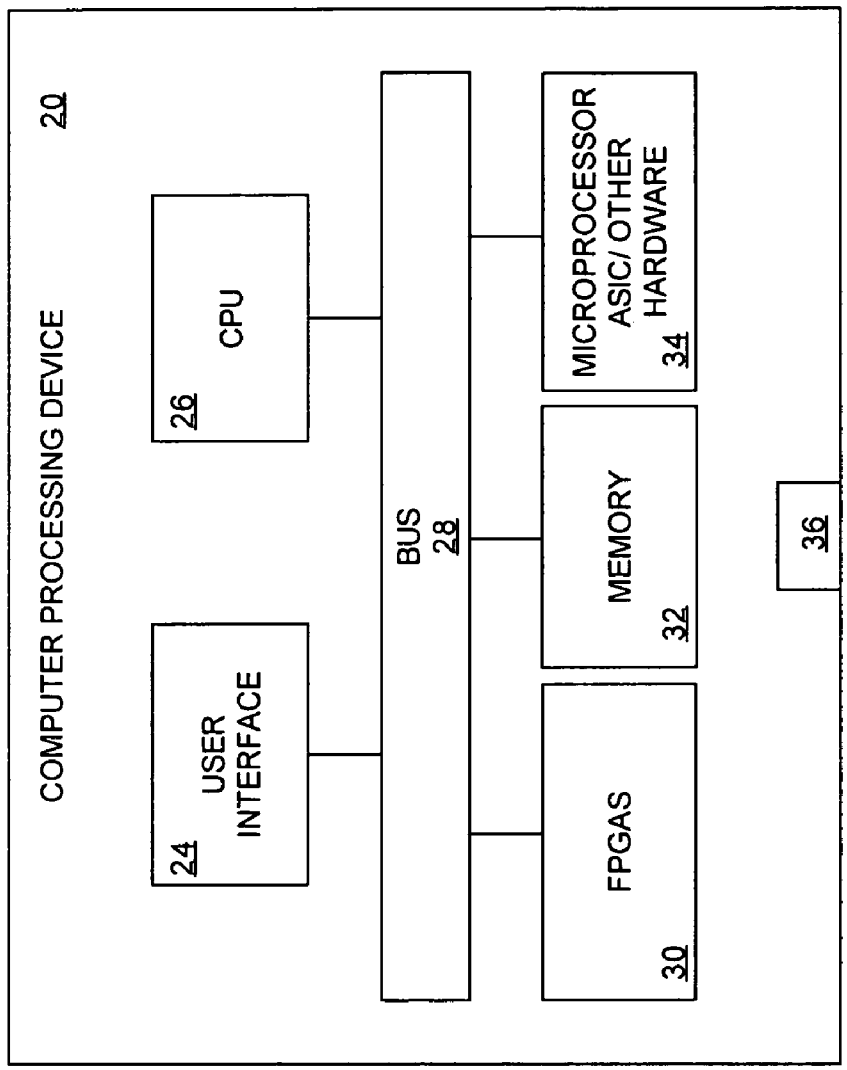
FIG. 2 is a block diagram of a computer processing device illustrated in FIG. 1.

FIG. 2 is a block diagram of a computer processing device illustrated in FIG. 1. Computer processing device 20 typically comprises a system interface 36, a user interface 24, a central processing unit 26, a system bus 28, a field programmable gate array (FPGA) 30, a memory 32 connected to and accessible by other portions of the computer processing device 20 through system bus 28, and hardware entities 34 connected to system bus 28. At least some of the hardware entities 34 perform actions involving access to and use of memory 32, which may be a RAM, a disk driver, and/or other forms of program bulk-storage. Hardware entities 34 may include microprocessors, ASICs, and other hardware. Hardware entities 34 may include a microprocessor programmed for booting the SDR using a boot software routine. The boot software routine will be described in detail below.

System interface 36 receives and communicates inputs and outputs from the A/D converter 16 and the D/A converter 18. User interface 24 facilitates a user action to create a request to access a software application for establishing a radio link, for transmitting a communication, and receiving a communication. User interface 24 may comprise display screen and an input means, such as a keypad, directional pad, and/or a directional knob.

Those skilled in the art will appreciate that the device architecture illustrated in FIG. 2 is one possible example of a computer processing device in which the boot software routine described below can be implemented. However, the invention is not limited in this regard and any other suitable computer processing device architecture can also be used without limitation.

Processing performed by the computer processing device 20 is typically performed in software using the hardware entities 34. The computer processing device 20 can support a software communications architecture. For example, computer processing device 20 can support an operating system, an object request broker, and an SCA core framework. The software communications architecture is illustrated in FIG. 3.

Figure 3:
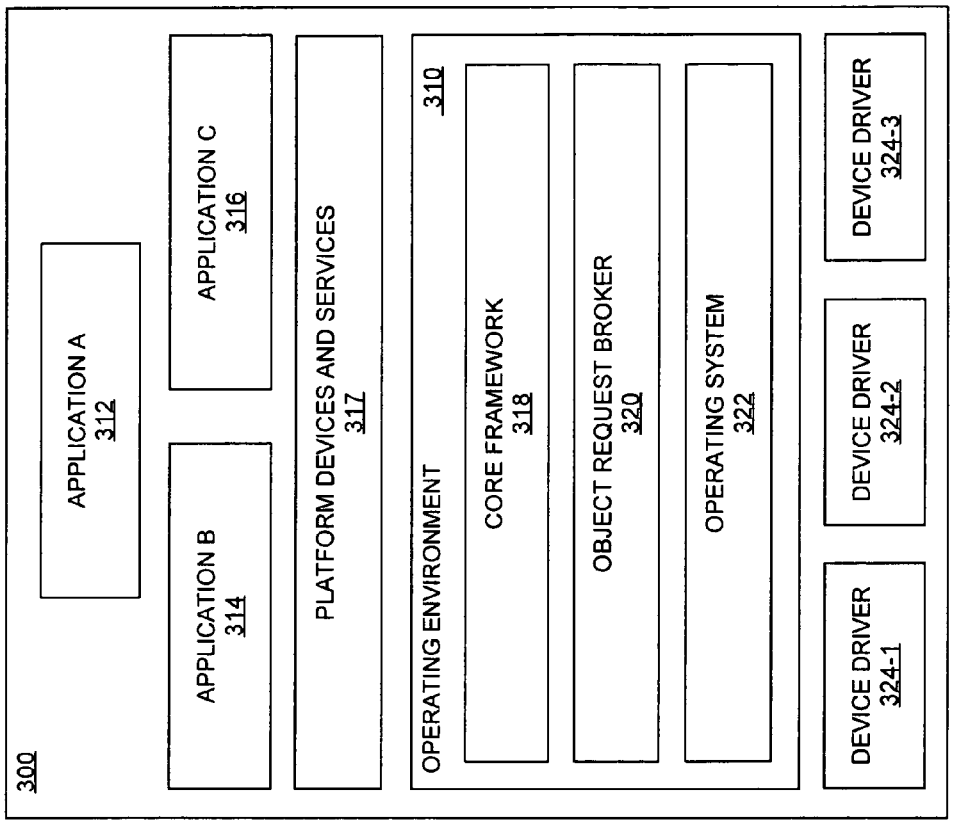
FIG. 3 is a block diagram of a software architecture of the computer processing device of FIG. 1.

Referring now to FIG. 3, a software architecture specified by a software communications architecture (SCA) is provided. The software architecture 300 can include levels of software programs. As shown in FIG. 3, the software architecture 300 includes device driver software programs 324-1, 324-2, 324-3, an SCA operating environment 310, platform device and service software programs 317, and software applications 312, 314, 316. The software programs of the architecture 300 are well known to persons skilled in the art. Thus, the software programs will not be described in great detail herein.

A device driver software program 324-1, 324-2, 324-3 typically is software the computer processing device 20 uses to facilitate communications between hardware components. A device driver software program 324-1, 324-2, 324-3 can include code for managing access to hardware components, taking hardware components in and out of service (i.e. allocate or deallocate), setting hardware component parameters, and transmitting data between hardware components. For example, a device driver software program 324-1, 324-2, 324-3 can allocate or deallocate a transmit device and/or a receive device.

The SCA operating environment 310 includes a real-time operating system (RTOS) 322, an object request broker 320, and an SCA core framework 318. The RTOS typically is system software responsible for the direct control and management of computer processing device 20 hardware of FIG. 2. Typically, the RTOS manages basic computer processing device 20 operations, such as loading and running software applications. The object request broker is middleware software responsible for transforming data structures to network defined structures, such as byte sequences, for transmission over a network. The object request broker can also include a software routine for enabling system switching between software programs and tracing the location of software programs. The SCA core framework is system software responsible for enabling a user to control hardware coupled to the computer processing device 20. The SCA core framework can also include instructions to install, launch, and manage applications. The operating environment 310 software programs are typically stored in memory 32 which may be a ROM, hard drive, or other storage device.

The platform device and service software programs 317 typically include CORBA component applications. CORBA component applications are well known to persons skilled in the art. Thus, CORBA applications will not be described in great detail herein.

The software applications 312, 314, 316 typically include programs designed for end users, such as radio communications programs ("waveforms") and database programs. For example, a typical software application is a radio channel control program, a waveform control program, and/or a communications application. The radio channel control program can include instructions for selecting a radio channel and configuring radio devices for enabling a user to listen to radio broadcasts. The waveform control program can include instructions for enabling a signal transmission by defining a frequency bandwidth, modulation, encryption, and/or decryption. The communications application typically includes instructions for frequency selection, modulation, and/or demodulation. The communications application can be hardware entity 34 independent. For example, the communications application can include instructions for communicating with a number of hardware entities 34 for performing frequency selection, modulation, and/or demodulation. The software applications 312, 314, 316 are typically installed on the computer processing device 20.

A person skilled in the art will appreciate that the software architecture 300 illustrates an embodiment of a software architecture in which the methods described below can be implemented. The invention is not limited in this regard and any other software architecture specified by a software communications architecture may be used without limitation.

Figure 4:
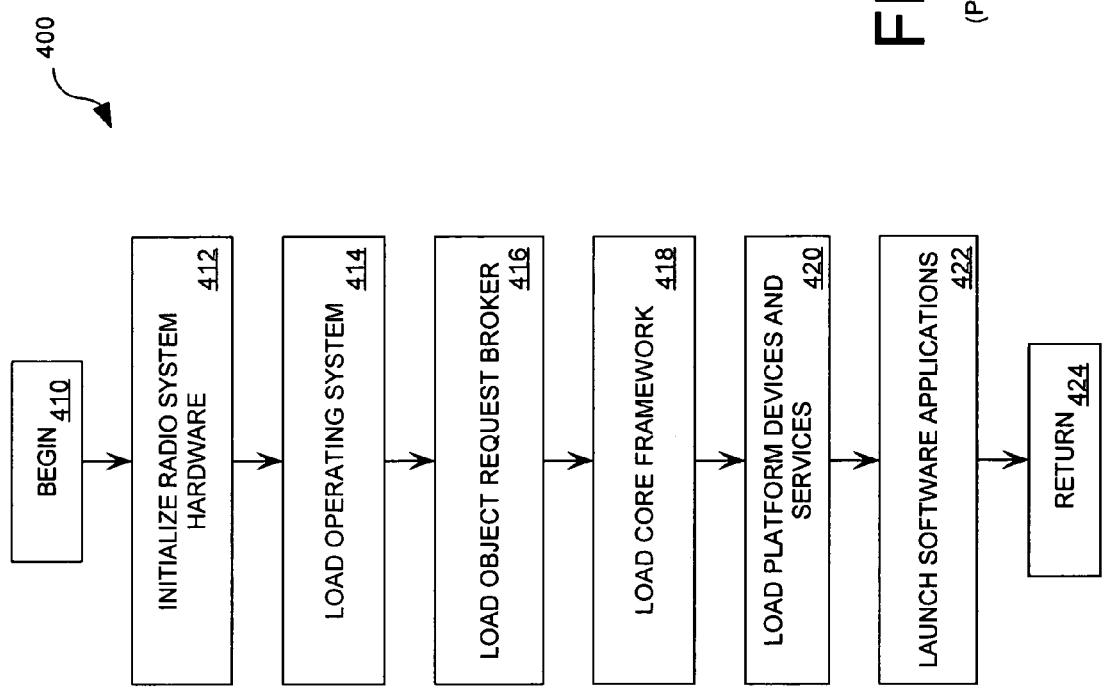
FIG. 4 is a flowchart of a traditional boot software routine for the software defined radio system shown in FIGS. 1-3.

FIG. 4 is a flowchart of a conventional boot software routine for the SDR of FIGS. 1-3. Boot software typically contains a defined routine for getting a computer processing device 20 fully operational (i.e. up and running). Boot software can include program code for loading and executing simple startup processes. For example, boot software can include instructions for loading and executing a program for launching an operating system and/or a software application.

The conventional boot software routine 400 typically includes five boot layers. The conventional boot software routine begins at 410 and continues with 412. In step 412, the SDR's hardware of FIGS. 1-2 is initialized. The initialization process typically includes applying power to the SDR's hardware. After initializing the SDR's hardware, the real-time operating system (RTOS) 322 is loaded in step 414. Typically, this step involves initializing a RTOS board support package (BSP). The initialization of a RTOS BSP typically includes initializing the device driver software programs 324-1, 324-2, 324-3. After initializing the RTOS BSP, a RTOS kernel is initialized. The RTOS kernel is a program that typically includes rules for memory management, process and task management, and disk management.

Subsequently, the object request broker 320 software program is loaded at step 416. After loading the object request broker, the core framework 318 software program is loaded in step 418. If a JTRS SCA is employed, this step can involve initializing a domain manager and a device manager. The domain manager is a tool providing run-time support of system configuration, initialization, and application startup. The device manager is a tool providing commands for enabling a user to control hardware. Once the operating environment 310 is fully loaded, the platform device and service software programs are loaded in step 420.

Subsequently, the software applications 312, 314, 316 are launched in step 422. Typically, this step involves launching a radio channel control program, a waveform control program, and/or a communications application. After the software applications are fully launched, step 424 is performed where the traditional boot software routine 400 returns to step 410.

In accordance with this boot software routine 400, the software applications 312, 314, 316 cannot be run until the full operating environment 310 is loaded, which can take minutes to complete. The slow processing is a result of a formal separation between the operating environment and the software applications, in conjunction with the use of a common object request broker. For example, this boot software routine 400 can provide a means to load megabytes of code, which can take minutes to perform. In effect, a SDR typically does not provide communications capabilities to a user until minutes after the user activates the SDR.

According to an embodiment of the invention, a boot software routine can be provided which allows a low level application, such as an emergency communications application, to run while the full operating environment 310 is being loaded. The low level application (i.e. small computer program) can be designed to load in a short amount of time, such as in seconds. In effect, a SDR using such a boot software routine can provide communications capabilities to a user within seconds after the user activates the SDR. Such a boot software routine is illustrated in FIG. 5 through FIG. 8.

Figure 5:
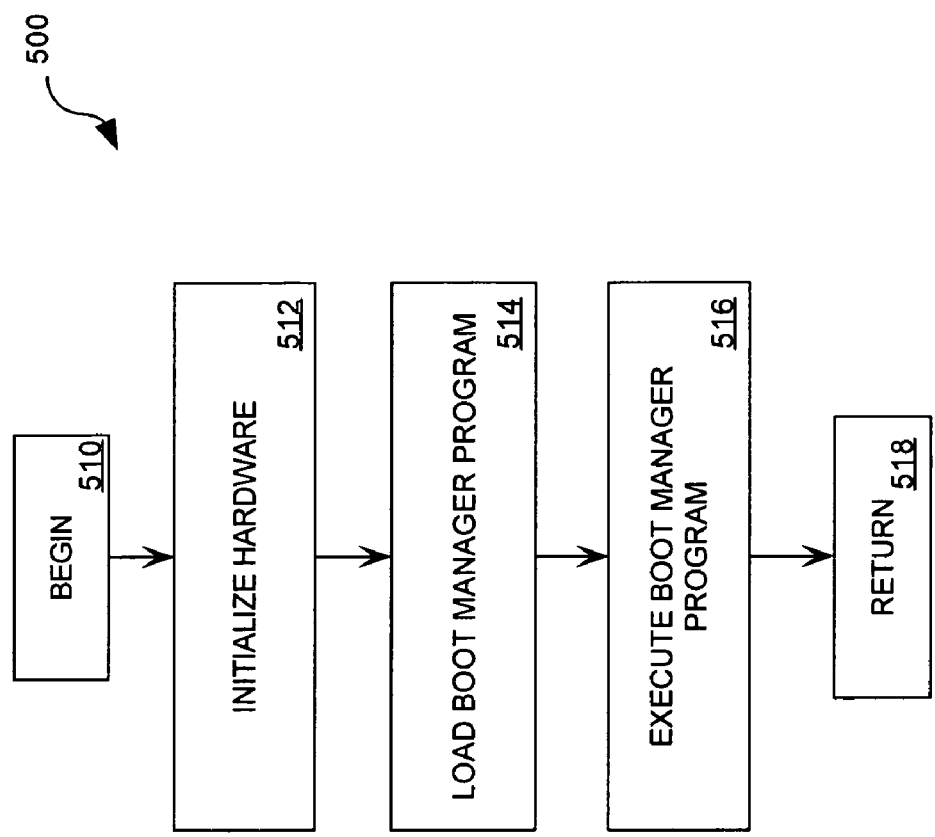
FIG. 5 is a flowchart of a software routine for booting the software defined radio system shown in FIG. 1-3 according to an embodiment of the invention.

FIG. 5 is a flowchart of a boot software routine that is useful for understanding the invention for booting the SDR of FIG. 1-3. The boot software routine can be used for getting a computer processing device 20 fully operational (i.e. up and running). The boot software routine provides an emergency communications capability to a user almost instantaneously by launching an emergency communications application prior to loading a full SCA operating environment. An emergency communications application is a low level radio function application. For example, the emergency communications application can include a set of pre-defined parameters, such as a given channel identifier and a given frequency value. The emergency communications application can include instructions for enabling system communications with a given microprocessor.

According to an embodiment of the invention, the boot software routine 500 begins at 510 and continues with 512. At step 512, the hardware can be initialized in a conventional manner. This step can involve loading a boot infrastructure into memory 32 and subsequently executing the boot infrastructure. A boot infrastructure is well known to persons skilled in the art. Thus, a boot infrastructure will not be described in great detail herein. A boot infrastructure is typically code to initialize hardware needed to load and execute a boot program. For example, a boot infrastructure can include code to apply power to hardware and to configure hardware needed to load and execute a boot program. Once the hardware is initialized, a boot manager program is loaded into memory 32 at step 514. After loading the boot manager program into memory 32, the boot software routine 500 continues with step 516. In step 516, the boot manager program is executed. After executing the boot manager program, step 518 is performed where the boot software routine 500 returns to step 510.

Boot manager programs are well known to persons skilled in the art. Thus, boot manager programs will not be described in great detail herein. The boot manager program typically coordinates the boot process such that software programs can be loaded in a given order. A person skilled in the art will appreciate that a boot manager is one embodiment of a program for enabling a boot of a wireless communications system. The invention is not limited in this regard and any other boot program (for example, a dual boot utility program) can be used without limitation.

Figure 6:
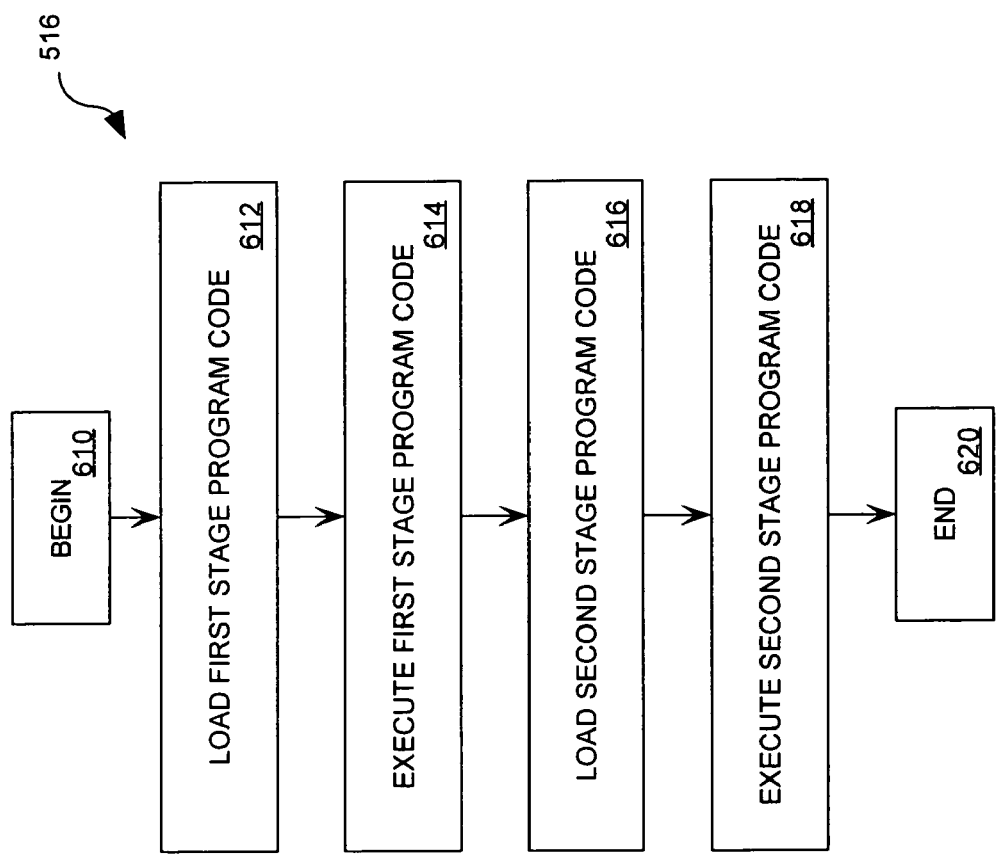
FIG. 6 is a flowchart of a software routine for the execute boot manager program step of FIG. 5 according to an embodiment of the invention.

FIG. 6 is a flowchart of a software routine for the execute boot manager program step of FIG. 5. According to an embodiment of the invention, the software routine 516 begins at 610 and continues with 612. In step 612, a first stage program code can be loaded into memory 32. After loading the first stage program code into memory 32, step 614 is performed. In step 614, the first stage program code can be executed. After executing the first stage program code, the second stage program code can be loaded into memory 32 at 616. After performing step 616, the second stage program code can be executed in step 618. After executing the second stage program code, step 620 is performed where the software routine 516 is completed.

According to an embodiment of the invention, the first stage program code can include instructions for booting a low level base platform comprised of an operating system and one or more software applications. The second stage program code can include instructions for booting a high level main platform comprised of a middleware and a core framework. The second stage program code for booting a high level base platform can be designed such that the process will not interfere with the hardware and low level software applications needed to perform a low level software application, such as an emergency communications application. For example, a low level device driver software program being used by an emergency communications application can appear in a "working but being used" state (i.e., allocated) to any high level software application that tries to access the low level software application. The high level software application can report the low level device driver software program state to the core framework as "working but disabled." This process can prevent any installed software application that requires access to the allocated low level software application from launching until the emergency communications application "releases" the low level software application.

A person skilled in the art will appreciate that the first stage program code and the second stage program code can both be loaded into memory 32 prior to executing either program codes. For example, the software routine can provide for concurrently loading the first stage program code and the second stage program code into memory 32. After the first stage program code has been loaded into memory 32, the software routine can continue by executing the first stage program code. Once the first stage program code has been executed and the second stage program code has been fully loaded, the software routine can continue by executing the second stage program code.

A person skilled in the art will further appreciate that the first stage program code and the second stage program code can each comprise a portion of a single larger program. For example, a software routine can include a step of loading a program with the first stage program code and the second stage program code into memory 32. After loading the program into memory 32, the program can be executed. By executing the program, respective processes associated with the first stage program code and the second stage program code can be executed in given order.

A person skilled in the art will further appreciate that the first stage program code and the second stage program code can exist within a single boot manager program or exist within independent boot manager programs. For example, the SDR 100 can include a base platform boot manger program and a main platform boot manger program. The base platform boot manager program can include the first stage program code. Similarly, the main platform boot manager program can include the second stage program code. Methods for executing a first boot manager program followed by a second boot manager program are well known to persons skilled in the art. Thus, such methods will not be described in great detail herein.

Figure 7:
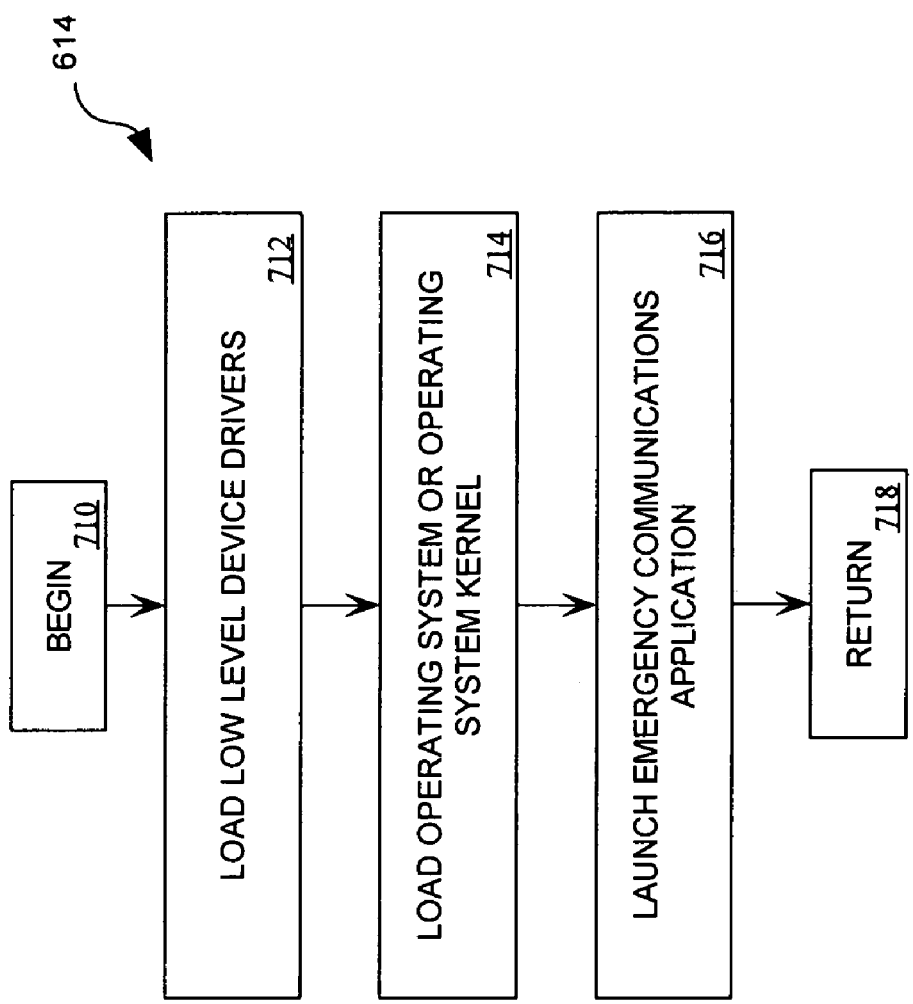
FIG. 7 is a flowchart of a software routine for the execute first stage program code step of FIG. 6 according to an embodiment of the invention.

FIG. 7 is a flowchart of a software routine for the execute first stage program code step 614 of FIG. 6. According to an embodiment of the invention, the software routine 614 can include booting instructions for loading software programs needed to run an emergency communications application and instructions for running an emergency communications application. For example, the emergency communications application can be dependant on device driver software programs and an operating system. Thus, the software routine 614 can include instructions for loading low level device driver software programs. The low level device driver software programs can include control code for a pre-defined transmitter, a pre-defined antenna, and a pre-defined frequency synthesizer. The software routine 614 can also include instructions for loading an operating system or an operating system kernel. Still it should be understood that the software routine 614 need not include instructions for loading all or a portion of an operating system. For example, an emergency communications application can be designed to require access to low level device driver software programs. The emergency communications application can be further designed to require access to all, a portion or none of the operating system.

Referring again to FIG. 7, the software routine 614 begins at 710 and continues with 712. In step 712, one or more low level device driver software programs can be loaded into memory 32. After loading the device driver software programs into memory 32, an operating system or an operating system kernel can be loaded into memory 32 in step 714. It should be understood that the operating system loaded in step 714 can be a separate operating system or a subset to an operating system loaded in response to a second stage program code (shown in step 811 of FIG. 8). Once the operating system is loaded into memory 32, the emergency communications application can be launched in step 716. After launching the emergency communications application, step 718 is performed where the software routine 614 returns to step 710.

The low level device driver software programs can be developed with low level applications for compliance with software routine 614. For example, the low level device driver software programs can be written with instructions to control a single transmitter, a single receiver, a single frequency synthesizer, and a single antenna. This implementation of the device driver software programs provides a small software program (i.e. minimal byte size) that can take seconds to load. Also, the device driver software programs can be "allocated" and "deallocated" upon stated events. This implementation of the device driver software programs allows an emergency communications application to allocate the device driver software programs such that the device driver software programs can be used immediately in a time critical situation. The device driver software programs can show "working, but unavailable" when a high level software application becomes fully booted and attempts to access the device driver software programs.

The emergency communications application can be designed to support low level base platform services, such as a basic human-machine interface and a communication transmission on a pre-defined channel and at a pre-defined frequency. The emergency communications application can also be designed to take seconds to initialize and require minimal control processing unit 24 loading. The emergency communications application can be designed to run at a priority such that the application will not be interrupted by the second stage program code processing shown in FIG. 5 which can be run in parallel with the emergency communications application.

A person skilled in the art will appreciate that a boot software routine can be designed such that step 712 and step 714 can be included in a single step. For example, loading an operating system step can involve loading the low level device driver software programs.

Figure 8:
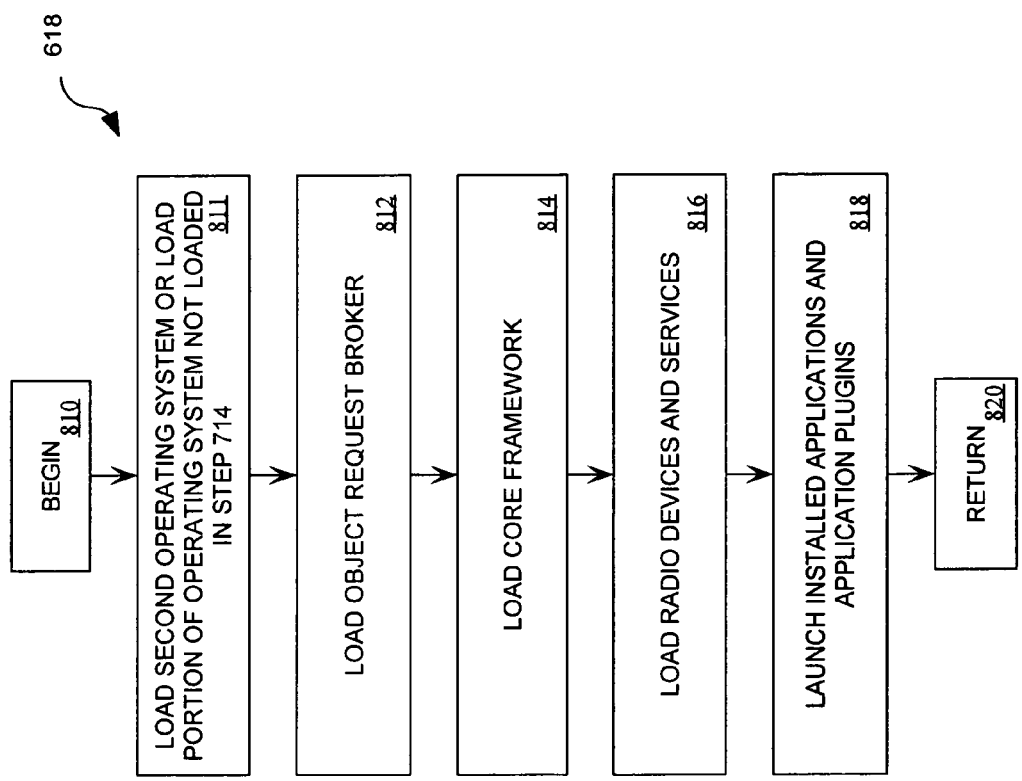
FIG. 8 is a flowchart of a software routine for the execute second stage program code step of FIG. 6 according to an embodiment of the invention.

FIG. 8 is a flowchart of a software routine for the 'execute second stage program code' step 618 of FIG. 6 according to an embodiment of the invention. The software routine 618 begins at 810 and continues with 811. In step 811, a second operating system or a portion of an operating system is loaded. It should be understood that the second operating system loaded in this step can be a separate operating system than that loaded in step 714 of FIG. 7. Alternatively, the operating system can be the portion of the operating system not loaded in step 714 of FIG. 7. Subsequently, step 812 is performed. In step 812, an object request broker is loaded into memory 32. After the object request broker is loaded, the core framework is loaded into memory 32 is step 814. The software routine 618 then continues with 816. In step 816, radio device software programs and radio service software programs are loaded into memory 32. A radio device software program can include instructions for controlling hardware such as an antenna, a transmitter, a receiver, and/or a frequency synthesizer. A radio service software program can include instructions for providing services such as encryption, decryption, and fault management. After the radio device software programs and radio service software programs are loaded, the installed applications are launched in step 818. The installed applications can include computer programs for channel control and waveform configuration. Also, the application plugins are launched in step 818. The application plugins are small programs that can be integrated into installed applications. A plugin typically provides functionality that is not available by the installed application. In step 818, the software routine 618 returns to step 810.

The software routine 618 can be designed such that the process has no dependencies on the emergency communications application and the low level software programs needed to run an emergency communications application, such as controlling a given antenna and a given transmitter allocated to an emergency communication. For example, the software routine 618 can be designed such that the emergency communications application and a low level device driver software program need not be loaded as a prerequisite to running the software programs of software routine 618. However, the radio devices can nevertheless communicate with the low level device driver software applications through the operating system booted in software routine 614 of FIG. 7. The low level device driver software programs being used in an emergency communications application can appear in a "working but being used" state when an installed software application, a radio device software program, and/or a radio service software program tries to access the low level device driver software programs. In such a scenario, the installed software application, the radio device software program, and/or the radio service software program can report the low level device driver software programs state to the core framework as "working but disabled." Notably, the "working but being used" state can make the low level device driver software programs "unavailable" to other software programs while the emergency communications application is running.

The emergency communications application can be terminated at some point in time after the second stage program code is executed and the high level main platform is fully booted. A person skilled in the art will appreciate that the emergency communications application can be terminated in a number of ways. For example, the emergency communications application can handoff control of the device drivers to a high level application. A person skilled in the art will appreciate that the handoff can be performed in a transparent (i.e. without a user's knowledge) or semi-transparent manner. The emergency communications application can also be terminated manually by a user. The user termination can enable the transfer of control to a high level application. Once the emergency communications application is terminated, the emergency communications application can execute instructions for releasing (i.e. deallocate) the low level device driver software programs. Upon release of the device driver software programs, the emergency communications application can include instructions for notifying the high level main platform that the low level device driver software programs have been released. Instructions for notifying a platform upon release or deallocation of a software program are well known to persons skilled in the art. Thus, such instructions are not described in great detail herein. After notification, the high level main platform software programs can report the low level device driver software programs state to the core framework as "working/enabled." Notably, the "working/enabled" state can make the low level device driver software programs "available" to other software programs. For example, a low level device driver software program can be allocated to a full communications application.

Figure 9:
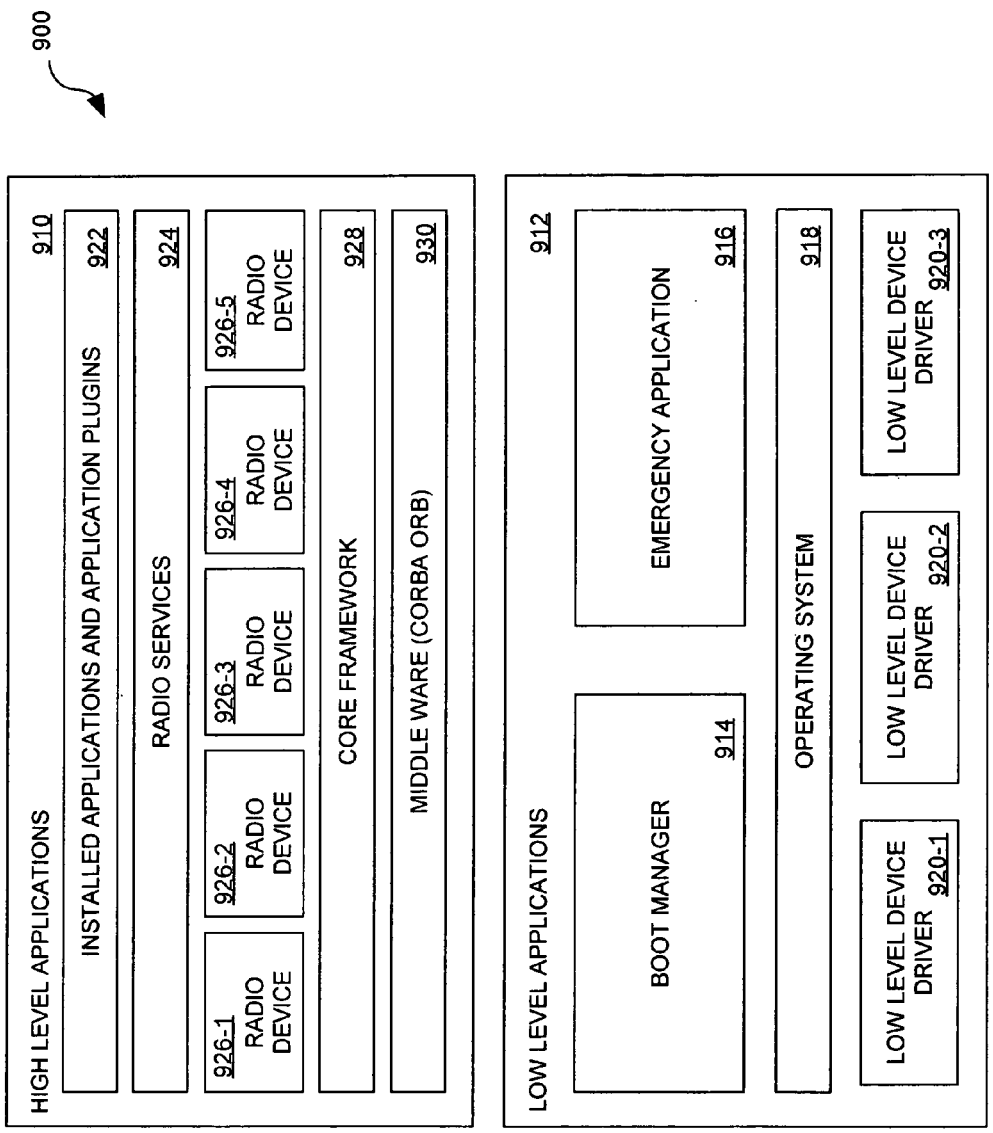
FIG. 9 is a block diagram of a boot image according to an embodiment of the invention.

FIG. 9 is a block diagram of a boot image according to an embodiment of the invention. The boot image 900 can include a low level applications package 912 and a high level applications package 910. The low level applications package 912 can include the software applications of a base platform. The high level applications package 910 can include software applications of a main platform.

As shown in FIG. 9, the low level applications package 912 can include software programs such as a boot manager program 914, low level device driver software programs 920-1, 920-2, 920-3, an operating system 918, and an emergency communications application 916. As described above, the boot manager program can coordinate the boot process such that a main platform is only booted after the emergency communications application is fully loaded.

The low level device driver software programs 920-1, 920-2, 920-3 can include code for allocation, deallocation, and other functions necessary for enabling an emergency communication. The operating system 718 can include code for accessing the device driver software programs 920-1, 920-2, 920-3. In effect, the low level device driver software programs 920-1, 920-2, 920-3 and the operating system 918 need to be up and running before the emergency communications application 916 can be loaded. It should be understood that all or a subset of the operating system 918 may be needed to be operational before an emergency communications application 916 is loaded. It should be further understood that the operating system can include a first stage operating system and a second stage operating system. In such a scenario, only the first stage operating system will need to be up and running before the emergency communications application 916 is loaded.

The emergency communications application 916 can include code to access radio channel device software program required for performing an emergency communication. The emergency communications application 916 can further include code for a human machine interface or other software control applications. While the emergency communications application 916 is running, the application can "allocate" the radio channel device driver software programs being used. An "allocation" operation is well known to persons skilled in the art. Thus, the allocation process will not be described in great detail herein.

The high level applications package 910 can include a middleware 930, a core framework 928, radio device software programs 926-1, 926-2, 926-3, 926-4, 926-5, a radio service software program 924, and installed applications and application plugins 922. Upon initialization, the radio device software programs 926-1, 926-2, 926-3, 9264, 926-5 can query the low level device driver software programs 920-1, 920-2, 920-3 to determine if the low level device driver software programs 920-1, 920-2, 920-3 are "allocated." If the low level device driver software programs 920-1, 920-2, 920-3 are "allocated" then the high level radio device software programs 926-1, 926-2, 926-3, 926-4, 926-5 can appear in a "working but disabled" state, as described above. If the low level device driver software programs 920-1, 920-2, 920-3 are not "allocated" then the low level device driver software programs can appear in a normal "working" state, as described above. A person skilled in the art will appreciate that this process can be performed periodically with a polling technique or other communications technique.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

I claim:

1. A method for booting a software operating environment and a plurality of software applications within a wireless communications system, comprising:

executing at least one boot manager program;

responsive to said boot manager program, executing a first stage program code and a second stage program code;

responsive to said first stage program code, launching a low level radio function application;

subsequent to launching said low level radio function application, loading a middleware and a core framework responsive to said second stage program code; and providing with said low level radio function application operational support for wireless communication transmissions on a predefined channel and at a predefined Radio Frequency while said middleware and said core framework are loading.

2. The method of claim 1, further comprising loading a plurality of device driver software programs responsive to said first stage program code.

3. The method of claim 2, further comprising allocating said plurality of device driver software programs to said low level radio function application.

4. The method of claim 3, further comprising reporting said plurality of device driver software programs state to said core frame work as working but disabled.

5. The method of claim 4, further comprising deallocating said plurality of device driver software programs when said low level radio function application has finished running.

6. The method of claim 1, further comprising loading an operating system responsive to said first stage program code.

7. The method of claim 1, further comprising loading an operating system kernel responsive to said first stage program code.

8. The method of claim 1, further comprising selecting said middleware to include an object request broker software program.

9. The method of claim 1, further comprising loading an operating system responsive to said second stage program code.

10. The method of claim 1, further comprising loading a portion of an operating system responsive to said second stage program code.

11. The method of claim 1, further comprising loading a plurality of radio device software programs responsive to said second stage program code.

12. The method of claim 1, further comprising loading plurality of radio service software programs responsive to said second stage program code.

13. The method of claim 1 further comprising launching at least one installed application and at least one application plugin responsive to said second stage program code, wherein said at least one installed application is selected to include instructions for communicating with a plurality of hardware entities for performing radio channel selection, frequency selection, modulation, or demodulation.

14. A computer program product in a computer readable medium for use in a data processing for booting a software operating environment and a plurality of software applications within a wireless communications system, the computer program product comprising:

instructions for executing at least one boot manager program;

instructions for executing a first stage program code, wherein said first stage program code comprises instructions for launching a low level radio function application;

instructions for executing a second stage program code subsequent to said instructions for launching a low level radio function application, wherein said second stage program code comprises instructions for loading a middleware and a core framework; and instructions for providing with said low level radio function application operational support for wireless communication transmissions on a predefined channel and at a predefined Radio Frequency while said middleware and said core framework are loading.

15. A method for booting a software operating environment and a plurality of software applications within a wireless communications system, comprising:

executing at least one boot manager program;

responsive to said at least one boot manager program, executing a first stage program code and a second stage program code;

responsive to said first stage program code, launching a low level radio function application;

subsequent to launching said low level radio function application, loading a middleware and a core framework responsive to said second stage program code;

allocating a plurality of device driver software programs to said low level radio function application;

reporting said plurality of device driver software programs state to said core frame work as working but disabled;

deallocating said plurality of device driver software programs when said low level radio function application has finished running; and reporting said plurality of device driver software programs state to said core frame work as working and enabled.

16. The computer program product of claim 14, wherein said first stage program code further comprises instructions for loading an operating system.

17. The computer program product of claim 14, wherein said first stage program code further comprises instructions for loading an operating system kernel.

18. The computer program product of claim 14, wherein said first stage program code further comprises instructions for launching a plurality of device driver software programs.

19. The computer program product of claim 18, wherein said first stage program code further comprises instructions for allocating said plurality of device driver software programs to said low level radio function application.

20. The computer program product of claim 19, wherein said first stage program code further comprises instructions for reporting said plurality of device driver software programs state to said core frame work as working but disabled.

21. The computer program product of claim 20, wherein said first stage program code further comprises instructions for deallocating said plurality of device driver software programs when said low level radio function application has finished running.

22. The computer program product of claim 14, wherein said middleware comprises instructions for an object request broker software program.

23. The computer program product of claim 14, wherein said second stage program code further comprises instructions for loading an operating system.

24. The computer program product of claim 14, wherein said second stage program code further comprises instructions for loading an operating system.

25. The computer program product of claim 14, wherein said second stage program code further comprises instructions for loading a plurality of radio device software programs.

26. The computer program product of claim 14, wherein said second stage program code further comprises instructions for loading a plurality of radio service software programs.

27. The computer program product of claim 14, wherein said second stage program code further comprises instructions for launching at least one installed application and at least one application plugin, wherein said at least one installed application comprises instructions for communicating with a plurality of hardware entities for performing radio channel selection, frequency selection, modulation, or demodulation.

28. A computer program product in a computer readable medium for use in a data processing for booting a software operating environment and a plurality of software applications within a wireless communications system, the computer program product comprising:
  instructions for executing at least one boot manager program;
  instructions for executing a first stage program code, wherein said first stage program code comprises instructions for launching a low level radio function application; and
  instructions for executing a second stage program code subsequent to said instructions for launching a low level radio function application, wherein said second stage program code comprises instructions for loading a middleware and a core framework;
    wherein said first stage program code further comprises instructions for launching a plurality of device driver software programs, instructions for allocating said plurality of device driver software programs to said low level radio function application, instructions for reporting said plurality of device driver software programs state to said core frame work as working but disabled. instructions for deallocating said plurality of device driver software programs when said low level radio function application has finished running, and instructions for reporting said plurality of device driver software programs state to said core flame work as working and enabled.

29. A computer processing system for booting a software operating environment and a plurality of software applications within a wireless communications system, comprising:
  a data store, wherein said data store comprises at least one boot manager program, a first stage program code comprising instructions for launching a low level radio function application, and a second stage program code comprising instructions for loading a middleware and a core framework; and
  a processor means communicatively coupled to said data store and responsive to said at least one boot manager program for executing said first stage program code and, only upon completion of executing said first stage program code, executing said second stage program code;
  wherein said low level radio function application is provided with operational support for wireless communication transmissions on a predefined channel and at a predefined Radio Frequency while said middleware and said core framework are loading.

30. The system of claim 29, wherein said first stage program code further comprises instructions for loading an operating system.

31. The system of claim 29, wherein said first stage program code further comprises instructions for loading an operating system kernel.

32. The system of claim 29, wherein said first stage program code further comprises instructions for loading a plurality of device driver software programs.

33. The system of claim 32, wherein said first stage program code further comprises instructions for allocating said plurality of device driver software programs to said low level radio function application.

34. The system of claim 33, wherein said first stage program code further comprises instructions for reporting said plurality of device driver software programs state to said core frame work as working but disabled.

35. The system of claim 34, wherein said first stage program code further comprises instructions for deallocating said plurality of device driver software programs when said low level radio function application has finished running.

36. The system of claim 29, wherein said second stage program code further comprises instructions for loading an operating system.

37. The system of claim 29, wherein said second stage program code further comprises instructions for loading an operating system.

38. The system of claim 29, wherein said second stage program code further comprises instructions for loading a portion of an operating system.

39. The system of claim 29, wherein said second stage program code further comprises instructions for loading a plurality of radio service software programs.

40. The system of claim 29, wherein said second stage program code further comprises instructions for launching at least one installed application and at least one application plugin, wherein said at least one installed application comprises instructions communicating with a plurality of hardware entities for performing radio channel selection, frequency selection, modulation, or demodulation 41. A computer processing system for booting a software operating environment and a plurality of software applications within a wireless communications system, comprising:
  a data store, wherein said data store comprises at least one boot manager program, a first stage program code comprising instructions for launching a low level radio function application, and a second stage program code comprising instructions for loading a middleware and a core framework; and
  a processor means responsive to said at least one boot manager program for executing said first stage program code and, only on completion of executing said first stage program code, executing said second stage program code;
    wherein said first stage program code further comprises instructions for loading a plurality of device driver software programs, allocating said plurality of device driver software programs to said low level radio function application, reporting said plurality of device driver software programs state to said core frame work as working but disabled, deallocating said plurality of device driver software programs when said low level radio function application has finished running, and reporting said plurality of device driver software programs state to said core frame work as working and enabled.

* * * * *